United States Patent [19]

Brand

[11] 4,367,763
[45] Jan. 11, 1983

[54] FOUR-WAY DIRECTIONAL VALVE

[76] Inventor: Glen Brand, 4114 N. 79th, Omaha, Nebr. 68134

[21] Appl. No.: 242,094

[22] Filed: Mar. 9, 1981

[51] Int. Cl.³ .............................................. F15B 13/04
[52] U.S. Cl. .................................... 137/106; 91/356; 137/624.18; 137/625.69; 144/193 A
[58] Field of Search ............. 91/356; 137/106, 624.18, 137/625.69; 144/193 A

[56] References Cited

U.S. PATENT DOCUMENTS

| | | |
|---|---|---|
| 3,267,966 | 8/1966 | Williams . |
| 3,680,583 | 8/1972 | Clair . |
| 3,724,483 | 4/1973 | Hubbard . |
| 3,738,379 | 6/1973 | Wilke . |
| 3,742,971 | 7/1973 | Worthington . |
| 3,980,336 | 9/1976 | Bitonti ..................... 137/625.69 X |
| 3,990,352 | 11/1976 | Nishida et al. . |
| 4,022,425 | 5/1977 | Govzman et al. . |
| 4,209,031 | 6/1980 | Sutton . |

Primary Examiner—Gerald A. Michalsky
Attorney, Agent, or Firm—Henderson & Sturm

[57] ABSTRACT

An automatic four-way valve hydraulically operated for extending and retracting a cylinder, which is spring-biased to the retract attitude until it is fully retracted whereupon a pressure build-up in a chamber between the spool and the valve body overrides the spring causing the valve spool to move to the neutral position.

2 Claims, 2 Drawing Figures

FOUR-WAY DIRECTIONAL VALVE

BACKGROUND OF THE INVENTION

1. Field of the Invention

The present invention relates generally to spool-type hydraulic control valves and more particularly to valves which are automatically driven to a neutral position after a predetermined amount of pressure in excess of working pressure is reached.

2. Description of the Prior Art

Valves in this particular field of art have many uses, such as, for example, a hydraulic log splitter wherein it is desirable for an operator to temporarily be absent from the manual control while the valve is retracting in order to retrieve another work-piece or organize the split logs while the cylinder rod is retracting. The more common and least complex control valve presently used for hydraulic log-splitters has a spool which is spring-biased to the neutral position. If the valve is held against resistance when the cylinder is retracting, which occurs most often when the rod is fully retracted, a relief valve opens allowing the pressures in the working valves to be maintained at a present limit. The attitude of this valve is neutral unless the manual control is held in either of its two working positions.

A more complex valve presently used includes a detent for holding the spool in the retract position until a relief valve within an end of the valve's spool permits the application of fluid pressure great enough to overcome the detent and thereby return the valve to neutral. This valve permits the operator to leave the valve in the retract attitude while he is performing other tasks. However, in order for the detent to function satisfactorily pressures of a magnitude of 600 to 800 psi must be developed before the detent is overcome. While this valve generally has performed satisfactorily, pressures of this magnitude tend to shorten the life on the hydraulic pump and other components of the system. Furthermore, it includes an additional relief valve and the detent parts. Such a detent mechanism is costly to maintain and requires heat treated parts which must slide in and out of grooves under high pressure.

In addition, none of the prior art devices known to the inventor will automatically move into the retract position. Such a feature would be desirable in that the extra motion to so orient the manual control required by the more complex device described hereinabove is eliminated, and in operations where production is of consequence, it is unnecessary to train operators to place the manual control in retract in order that the cylinder will automatically return to an attitude for receipt of another work-piece prior to the operator removing his hand from the manual control lever.

SUMMARY OF THE INVENTION

The present invention is a much simplified single spool packaged-type unit which eliminates the need for a small separate relief valve and detent mechanism to automatically move the valve spool to neutral after a pre-determined resistance is met, such as when the cylinder is fully retracted. In lieu therefor, automatic sequence is provided through a passageway in the spool between the high pressure port and a pressure receiving chamber located at the spring-biased end of the valve spool. Said passageway is in operative position whenever the valve spool is in retract position, said position being when the compression spring is fully extended. In the preferred embodiment, the pressure receiving chamber is formed by a constriction in the diameter of the valve spool near its spring-biased end. Thus, the spool of the present invention will automatically move to a retract position, absent sufficient resistance to the retract movement. After sufficient resistance is met, such as when the cylinder is fully retracted, the spool will automatically move into its center neutral position through a pressure buildup in the pressure receiving chamber. As with prior art valves, the valve spool may be manually moved to neutral position or to a second working position, which in the example described herein, is the extending position.

An object of the present invention is the provision of an improved automatic sequential hydraulic valve.

Another object is to provide a valve which will automatically move into an operating position when the manual control is unattended.

A further object of the invention is the provision of a valve which will automatically move from a retract position to the neutral position after pressure buildup in the high pressure line caused by a restraint has increased to a relatively low level.

Still another object of the invention is to provide a valve which will automatically move into retract upon release of the manual control.

A still further object is to provide an automatic sequential hydraulic valve which does not have a detent mechanism.

A still further object of the present invention is to provide an automatic sequential valve which is relatively inexpensive to manufacture and maintain, has fewer working parts, suffers less breakdown time, and puts minimal strain on the hydraulic pump and other components of the hydraulic system during the retract operation.

Other objects, advantages and novel features of the present invention will become apparent from the following detailed description of the invention when considered in conjunction with the accompanying drawings.

DESCRIPTION OF THE PREFERRED EMBODIMENT

Figure 1:
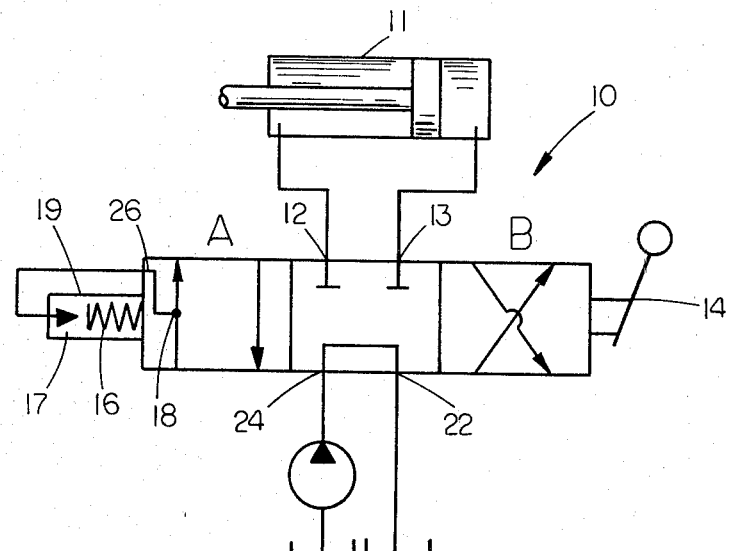
FIG. 1 is a schematic diagram of the hydraulic control circuit of the present invention.

Referring now to the drawings wherein like reference numerals designate identical or corresponding parts throughout the several views and, more particularly, to FIG. 1, whereon the automatic sequential valve control system of the present invention is generally identified by reference numeral 10. The control system 10 which operates, in this example, a conventional hydraulic log splitter cylinder 11, is a four-way, three-position valve spool having a first working position (A) which retracts the cylinder, a second working position (B) which extends the cylinder, and a tandem center neutral position with fluid locked in the working ports 12 and 13 and the pump is unloaded to the tank. The valve is manually controlled by push-pull handle 14 which overrides compression spring 16, the spring 16 biased to urge the valve into the (A) position. As pressure builds in port 12, the pressure is also transferred to pressure receiving chamber 17 through port 18 and passageway 26. In this embodiment, pressure receiving chamber 17 is located between spring housing 19, which contains spring 16, and the adjacent portion of the valve spool. Thus, any time the valve spool is in the retract position (A), and a pressure sufficient to override compression spring 16 is present in pressure receiving chamber 17, the valve spool will move to the center neutral position.

Figure 2:
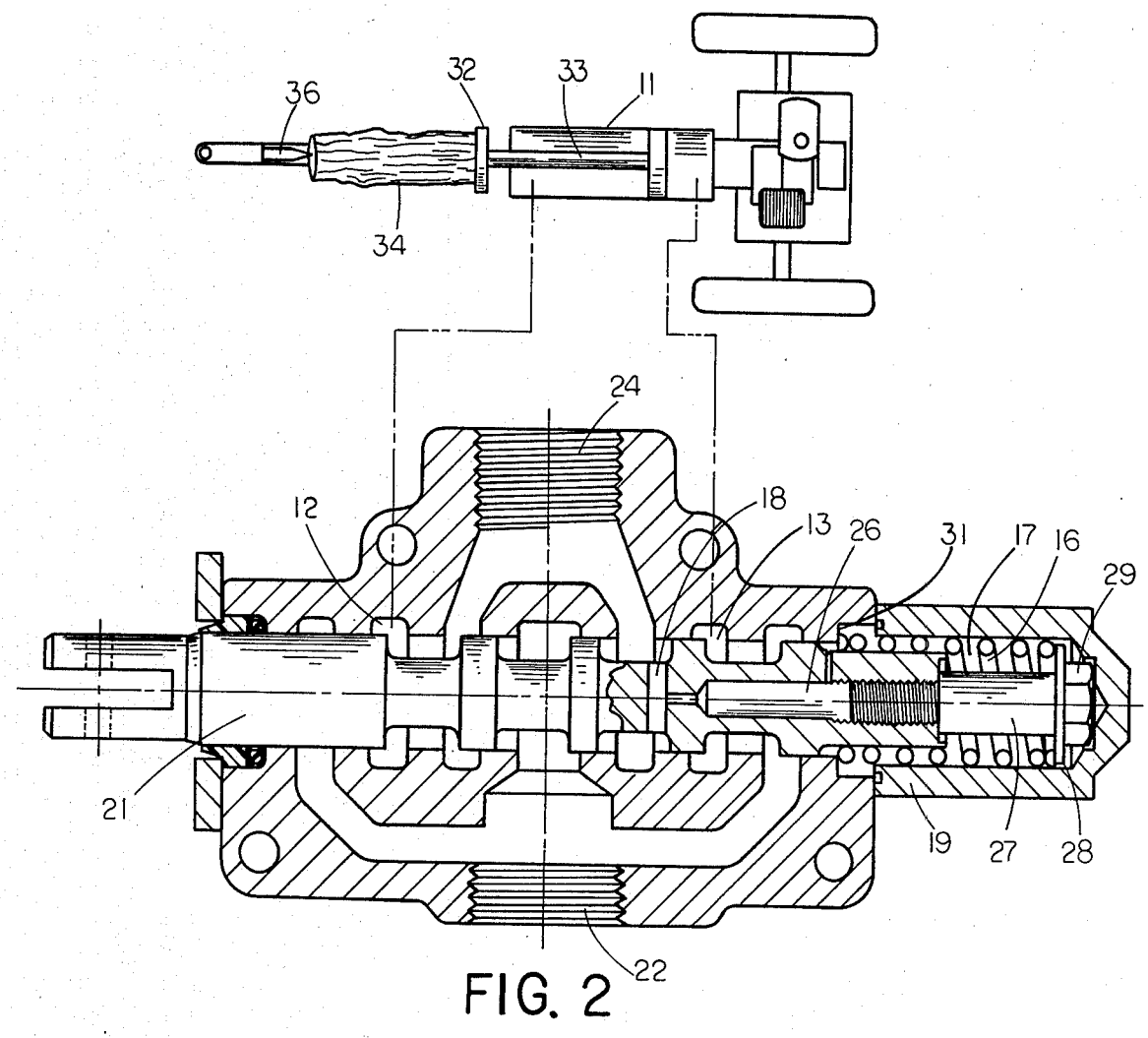
FIG. 2 is a longitudinal sectional view of the hydraulic control valve of the present invention.

FIG. 2 is the actual structural drawing of the control system 10 diagramatically illustrated in FIG. 1. Valve spool 21 is shown in the cylinder retract position (A) with fluid flowing from the cap end of cylinder 11 through port 13 out return port 22. Port 18 is located in valve spool 21 so as to maintain a connection between high pressure port 24 and pressure receiving chamber 17 through a passageway 26 within valve spool 21. The connection is maintained whenever, and only when, valve spool 21 is in position (A), the neutral position, or moving therebetween. Pressure receiving chamber 17 exists in this embodiment by virtue of the end of valve spool 21 adjacent to compression spring 16 (designated as numeral 27), being constricted in diameter. Compression spring washer 28 is secured to the constricted end 27 of valve spool 21 by bolt 29 and holds spring 16 against shoulder 31 of the valve body. The end of valve spool 21 adjacent spring 16 is threaded to receive bolt 29.

To operate valve system 10, as for example when it is used for a hydraulic log splitter, push-pull handle 14 is operated to move valve spool 21 to position (B), the cylinder extend position, against the resistance of compression spring 16. As cylinder 11 approaches the end of its stroke, a pusher plate 32 connected to cylinder rod 33 moves a log 34 in working position against a stationary wedge 36. When push-pull handle 14 is released, valve spool 21 is returned to retract position (A) by compression spring 16 working against washer 28.

When cylinder 11 is fully retracted, and the pusher plate 32 is held against the rod end of cylinder 11, working pressure in working port 12 rises. At some point, depending on the compressive strength of compression spring 16, the hydraulic fluid which is present in the pressure receiving chamber 17 will be subject to the increasing working pressure in working port 12 through port 18 and passageway 26. When this increase in pressure overrides compression spring 16, it will move valve spool 21 into the tandem center neutral position. Once valve spool 21 is in the neutral position, the pressure in pressure relief chamber 17 will discontinue rising, since in this position, port 18 is open to both high pressure port 24 and return port 22.

Thus, if the operator removes his hand from push-pull handle 14 for any reason, cylinder 11 will automatically retract to its fully retracted position, after which the working pressure will rise until it reaches that level which will cause it to override compression spring 16. At this point, the valve control system 10 moves into neutral position, and remains there until the operator wishes to extend the cylinder to split the next log.

As can be appreciated, the present invention will function at far lower pressures than those necessary to overcome the required biasing force of spring detents, thus providing for an automatic sequence to neutral at a materially lower pressure. Furthermore, it is not necessary for the operator to consciously set the valve in retract position in order to leave for another work piece or use both hands to straighten the split logs, since the valve automatically moves to retract position upon the release of push-pull handle 14.

Obvious numerous modifications and variations of the present invention are possible in light of the above teachings. It is therefore to be understood that within the scope of the appended claims, the invention may be practised otherwise than as specifically described herein.

I claim:

1. A four-way directional hydraulic spool valve having a valve body with a valve spool bore comprising:

a high pressure port into said valve body bore;

a return port into said valve body bore;

a first working port into said valve body bore;

a second working port into said valve body bore;

a spool valve slidably disposed within said valve body bore having a first working position, a central neutral position, and a second working position;

means on said valve spool for connecting said high pressure port with said first working port and said second working port with said return port when the spool is in said first working position;

means on said valve spool for connecting said high pressure port with said return port and locking fluid in the working ports when said spool is in the center neutral position;

means on said valve spool for connecting said high pressure port with said second working port and said first working port with said return port when the spool is in said second working position;

biasing means within said valve body bore for urging said valve spool into said first working position whereby force must be applied to the valve spool to move it from the first working position into either the neutral position or the second working position; and fluid bypass means for automatically moving said spool valve from said first working position against the force of said biasing means, to said neutral position and fluidly holding said spool valve in said neutral position upon reaching a predetermined pressure in said high pressure port, said bypass means including pressure receiving means on a portion of said spool disposed within a chamber within said valve body for moving said spool, against the urging of the biasing means, from the first working position into said neutral position, and passageway means disposed within said spool valve and being in constant fluid communication with said high pressure port and said pressure receiving means when said spool valve is in same first working position thereof for transferring fluid pressure from said high pressure port to said pressure receiving means, whereby an operating restraint in the first working position of said spool valve will cause the spool valve to be moved to and held in the neutral position until the pressure in said high pressure port drops below said predetermined level or said spool valve is moved to said second working position thereof.

2. A directional valve as set forth in claim 1 wherein said pressure receiving means is rigidly attached to one end of said spool valve.

* * * * *